(12) United States Patent
Longoni

(10) Patent No.: US 7,020,124 B2
(45) Date of Patent: Mar. 28, 2006

(54) FRAME CONTROL METHOD AND APPARATUS

(75) Inventor: Fabio Longoni, Espoo (FI)

(73) Assignee: Nokia Corporation, Espoo (FI)

( * ) Notice: Subject to any disclaimer, the term of this patent is extended or adjusted under 35 U.S.C. 154(b) by 939 days.

(21) Appl. No.: 09/825,898

(22) Filed: Apr. 4, 2001

(65) Prior Publication Data

US 2004/0213193 A1   Oct. 28, 2004

Related U.S. Application Data

(63) Continuation of application No. PCT/EP98/06334, filed on Oct. 5, 1998.

(51) Int. Cl.
  *H04B 7/216* (2006.01)
  *H04L 12/28* (2006.01)
(52) U.S. Cl. .................................. 370/342; 370/395.61
(58) Field of Classification Search ................ 370/335, 370/342, 474, 395.6, 351–356, 395.61, 466
  See application file for complete search history.

(56) References Cited

U.S. PATENT DOCUMENTS 6,374,112 B1 *  4/2002  Widegren et al. ......... 455/452.2
6,414,967 B1 *  7/2002  Van Grinsven et al. ..... 370/466
6,631,116 B1 * 10/2003  Eneroth et al. .......... 370/236.2

FOREIGN PATENT DOCUMENTS

WO       96/21983     7/1996
WO       97/16890     5/1997
WO    WO 97/38537    10/1997

OTHER PUBLICATIONS

Marco Boldt, Modeling an ATM Based Acess Network for 3rd Generation Mobile Communication Networks. May 1998, IEEE pp. 2590-2593.*
"ATM Transport in Cellular Networks" Eneroth, et al., ISS 1997 World Telecommunications Congress. Global Network Evolution: convergence or Collision? Toronto, Sep. 21-26, 1997.
May 15, 1992, "The Asynchronous Transfer Mode: A Tutorial" Boudec. Computer Networks and ISDN Systems, vol. 24, No. 4, pp. 279-309.

* cited by examiner

*Primary Examiner*—Steven Nguyen
(74) *Attorney, Agent, or Firm*—Squire, Sanders & Dempsey LLP

(57) ABSTRACT

A frame control method and apparatus is described for controlling a transport frame used for transmitting a data unit via a dedicated channel between network elements of a communication system having different types of connections. The frame type coding of the transport frame is selected in accordance with a connection type of the dedicated channel, such that a connection type specific frame length, dimension and/or segmentation is achieved. This allows an efficient usage of transmission resources, wherein an overhead of control information for the transmission of the data units is achieved.

9 Claims, 2 Drawing Sheets

FRAME CONTROL METHOD AND APPARATUS

This application is a continuation of international application serial number PCT/EP98/06334, filed 5 Oct. 1998.

FIELD OF THE INVENTION

The present invention relates to a frame control method and apparatus for controlling a transport frame used for transmitting a data block via a dedicated channel between network elements of a communication system having different types of connections, such as a WCDMA (Wideband Code Division Multiple Access) system for the UMTS (Universal Mobile Telecommunications System).

BACKGROUND OF THE INVENTION

Third generation mobile telecommunications systems aim at providing end-users, apart from terminal and personal mobility, with enhanced services. Compared to second generation systems, enhancements that will cover features all the way between the end-user and the core network elements are required, i.e. from mobile terminals to radio access and fixed networks. The UMTS is such a third generation system, wherein, for example, Asynchronous Transfer Mode (ATM) technologies may be selected so as to represent a business environment and support fixed ATM terminals.

Delivering wide band multimedia services will require additional performance compared with today's wireless standards. In this respect, research has been conducted focusing on WCDMA which fully supports both packet- and circuit-switched communications such as Internet browsing and land line telephone services, respectively.

WCDMA is based on a modern, layered network-protocol structure similar to the protocol structure used in, for instance, GSM networks. This will-facilitate the development of new wireless wide band multimedia applications. With increasing demand for next-generation mobile telephone services, there will be a new set of requirements on a wireless systems, such as:

support for high speed data communication;
support for both packet- and circuit-switched services, such as internet traffic and video conferencing;
higher network capacity, better usage of the frequency spectrum, each user will require more capacity compared to today's voice services;
support for several connections.

Users will, for instance, be able to browse the Internet in parallel to voice calls and/or video conferencing.

Recently, the European Telecommunications Standards Institute (ETSI) decided on WCDMA as the radio technology for the paired bands of the UMTS. The same applies to the standardization bodies of Japan and the USA. Consequently, WCDMA is the common radio technology standard for third-generation wide-area mobile communications in Europe, North America and Asia.

The WCDMA concept is based on a totally new channel structure for all layers (L1 to L3) build on technologies such as packet-data channels and service multiplexing. The new concept also includes pilot symbols and a time-slotted structure.

In practice, certain key parameters in WCDMA and GSM have been harmonized in order to achieve an optimum solution for dual-mode GSM/UMTS terminals as well as GSM/UMTS hand-over. This will facilitate today's users easy access to third-generation services through dual-mode terminals, as will be the case with UMTS/GSM terminals.

In WCDMA systems, user plane data entities (in the following referred to as transport blocks TB) need to be transported between a radio network controller (RNC) and a base station (BS) of a mobile network like the GSM network. A frame layer control protocol exists that handles the transmission between the above two-network elements (BS and RNC), which is referred to as Radio Block Transport Protocol (RBTP) in the following.

The RBTP is adapted to attach to a transport block TB all information which the layers 2/3 in the RNC and the layer 1 in the BS need to exchange. This information is necessary for synchronization (e.g. a frame number to synchronize the transmission), outer loop PC (e.g. a frame reliability information and a power control command), macro diversity combining (e.g. a system frame number and the L1 cyclic redundancy check), indication of L1 processing to be done (e.g. a transport format indicator TFI), and identification of a channel to which the present TB belongs.

According to a known solution, a fixed structure of the RBTP frame for one kind of channel is used, e.g. there is one structure for a dedicated channel with a fixed number of bit reserved for every field.

However, the parameters necessary to be attached to the TB are different for different kind of transport channels that the WCDMA system supports (e.g. common channels, dedicated channel with and without soft handover possibility, high and low bit rate, fixed or variable bit rate, best effort packet data channels), because the nature of the channels and the characteristic of the data transmitted over them are different.

Therefore, the above known solution leads to the drawback that the transmission link is not efficiently used, since the RBTP frame may contain information which is not necessary or which can be specified with a minor number of bits, due to the specific characteristic of the channel.

SUMMARY OF THE INVENTION

It is therefore an object of the present invention to provide a frame control method and apparatus which allow flexibility and minimum usage of the transmission link capacity.

This object is achieved by a frame control method for controlling a transport frame used for transmitting a data unit via a dedicated channel between network elements of a communication system having different types of connections, comprising the steps of:

encapsulating a data unit into said transport frame; and
selecting a frame type coding of said transport frame in accordance with a connection type of said dedicated channel.

Additionally, this object is achieved by a frame control apparatus for controlling a transport frame used for transmitting a data unit via a dedicated channel between network elements of a communication system having different types of connections, comprising:

means for encapsulating said data unit into said transport frame; and
means for selecting a frame type coding of said transport frame in accordance with a connection type of said dedicated channel.

Accordingly, an adaptive frame type coding is provided, which allows a very efficient usage of the transmission resources between the network elements, whereby the overhead of the control information for the transmission of the user data is reduced to a minimum. Moreover, the memory required to buffer the user data in the network elements is reduced. This benefit is of particular advantage in WCDMA systems, because dedicated channels with a wide range of characteristics are provided therein, and the usage of a common structure for the transport leads to a high protocol overhead, particularly for speech channels. Nevertheless the above solution can be used in any communication system having different types of connections.

In view of the fact that a minimum control information is used, processing capacity can be reduced, since the decoding processing requires less processing capacity.

Preferably, the frame type coding defines specific control information fields of the transport frame and their bit number. Thus, unnecessary control information fields which are not required for specific connection types of a dedicated channel can be canceled or at least their bit number can be reduced, so as to reduce the overhead of the control information. In particular, the bit number of a transport format indicator field can be determined on the basis of the number of different transport format indicators allowed for a dedicated channel.

Furthermore, the value of the transport format indicator field may define if and how a whole original data unit is split into different data units to be transported via the dedicated channel. Thereby, a segmentation of a transport data block may be performed, if its dimension exceeds the maximum dimension allowed by the underlying transport mechanism of the connection type of the dedicated channel.

Moreover, the value of the transport format indicator field may define the presence and/or bit number of another one of said specific control information fields. Thereby, a specific control information relating to the transport format of the connection can be added or adapted. Such a specific control information may be a frame reliability information required for high bit rate transmissions in order to improve quality control.

The coding format may be selected in a set-up phase of the dedicated channel based on corresponding set-up parameters of the dedicated channel. Thus, the structure of the transport frame readily can be changed when a change of the channel parameters of the dedicated channel has been detected.

In case only one transport connection is allocated to the dedicated channel, a channel indicator field may be deleted from the control information, since the network elements at the receiving and the transmitting end already know the type of connection, such that the frame type can be decoded at the receiving end using both the information concerning the connection type and the short frame information code provided in a transport frame itself.

The frame control method preferably may be used in a user plane interface of a WCDMA system. The dedicated channel may be an ATM AAL2 channel, wherein the data unit may be a user plane data unit.

In case the frame control method is used in a mobile communication system, such as the GSM system, the network elements may comprise a base station and a radio network controller.

BRIEF DESCRIPTION OF THE DRAWINGS

In the following the present invention will be described in greater detail on the bases of a preferred embodiment with reference to the accompanying drawings in which.

DESCRIPTION OF THE PREFERRED EMBODIMENT

The following preferred embodiment relates to a frame control method used in a WCDMA system used in a mobile communication system.

Figure 1:
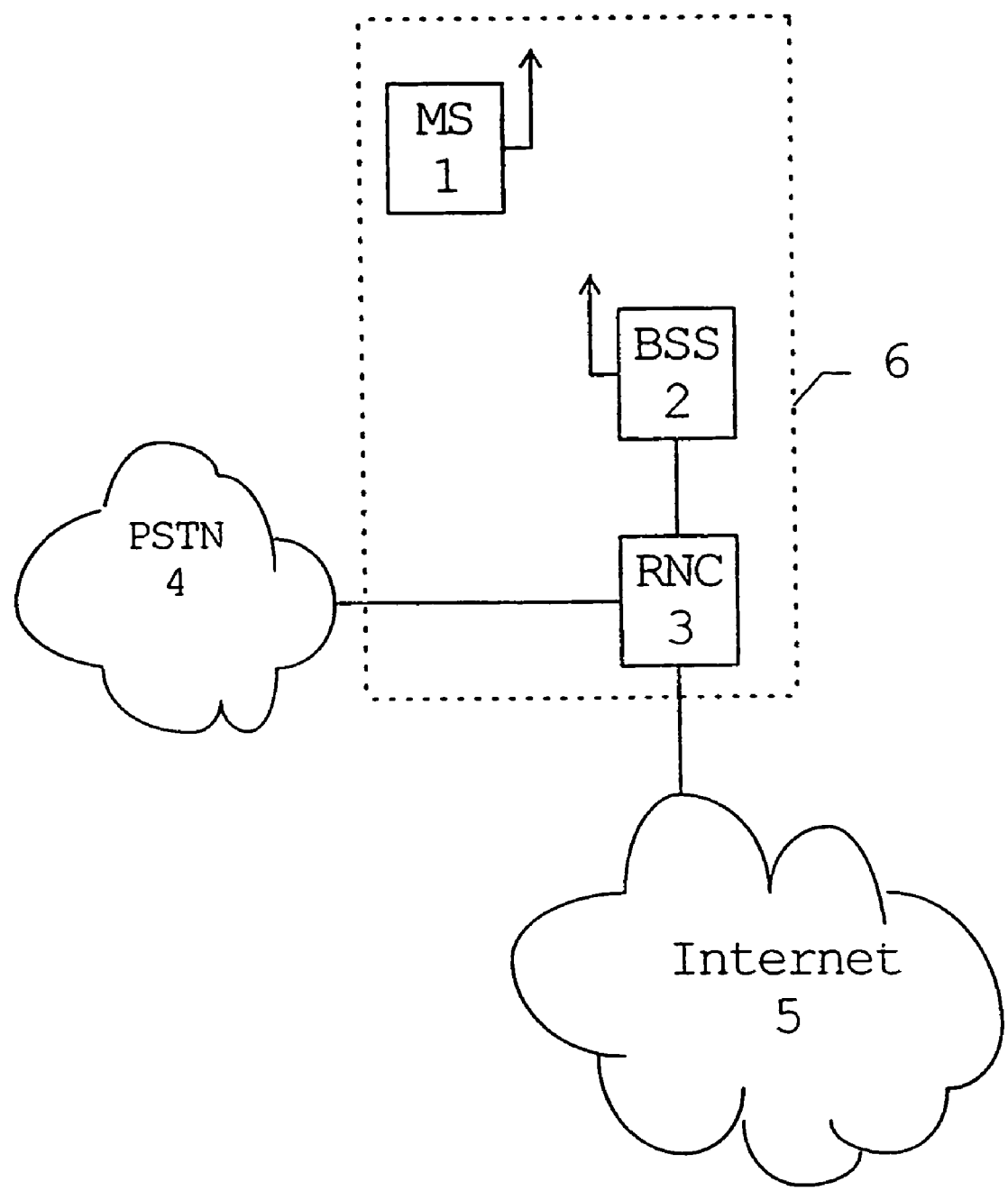
FIG. 1 shows a block diagram of a mobile communication system connected to different network types in order to deliver multimedia services.

According to FIG. 1, a mobile communication system 6 comprises a mobile station (MS) 1 radio-connected to a base station subsystem (BSS) 2. The BSS 2 is connected to a radio network controller (RNC) 3 which may be connected to a circuit-switched network like a Public Switched Telephone Network (PSTN) 4 and to a packet-switched network like the Internet 5.

The WCDMA system enables a full support of both packet- and circuit-switched communications.

In the WCDMA system according to the preferred embodiment, the RBTP is used to adapt the UMTS user plane interfaces Iur and Iub between the RNC 3 and the BSS 2. In particular, the RBTP is used to adapt the TB, i.e. a user plane data unit such as a MAC PDU (Media Access Control Packet Data Unit), to an AAL 2 channel (ATM Adaptation Layer type 2). In such a transmission, the type of the transport frame (RBTP frame) has to be indicated in each frame. However, in at least most connection types only a small subset of the possible FCL frame types is used. The TBs (MAC PDUs) are encapsulated by the RBTP in frames that contain all the relevant information which is to be exchanged between the BSS 2 and the RNC 3.

Figure 2:
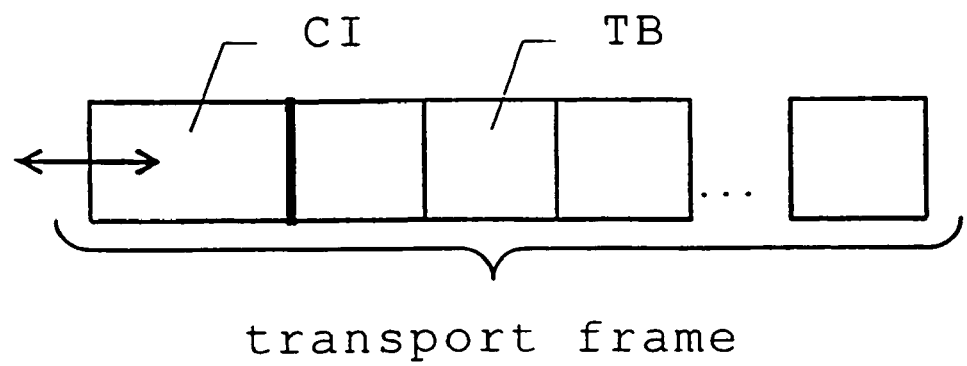
FIG. 2 shows a principle diagram of a transport frame used in the frame control method according to the present invention.

FIG. 2 shows an example for such a transport frame. According to FIG. 2, the transport frame consists of transport blocks TB and a control information portion CI comprising a plurality of control information fields The control information portion CI forms the head of the transport frame and is may be called "header" of the transport frame. The control information field CI is followed by a plurality of transport blocks TB which correspond to the user plane data units (PDUs).

As indicated by the arrow in FIG. 2, the RBTP defines a connection type specific frame type coding of the transport frame, wherein different bit rates and different natures of the dedicated transport channel (e.g. an AAL2 link) are considered. In particular, the information fields of the control information portion CI of the transport frame and their bit numbers are selected in accordance with the connection type of the dedicated transport channel.

Figure 3:
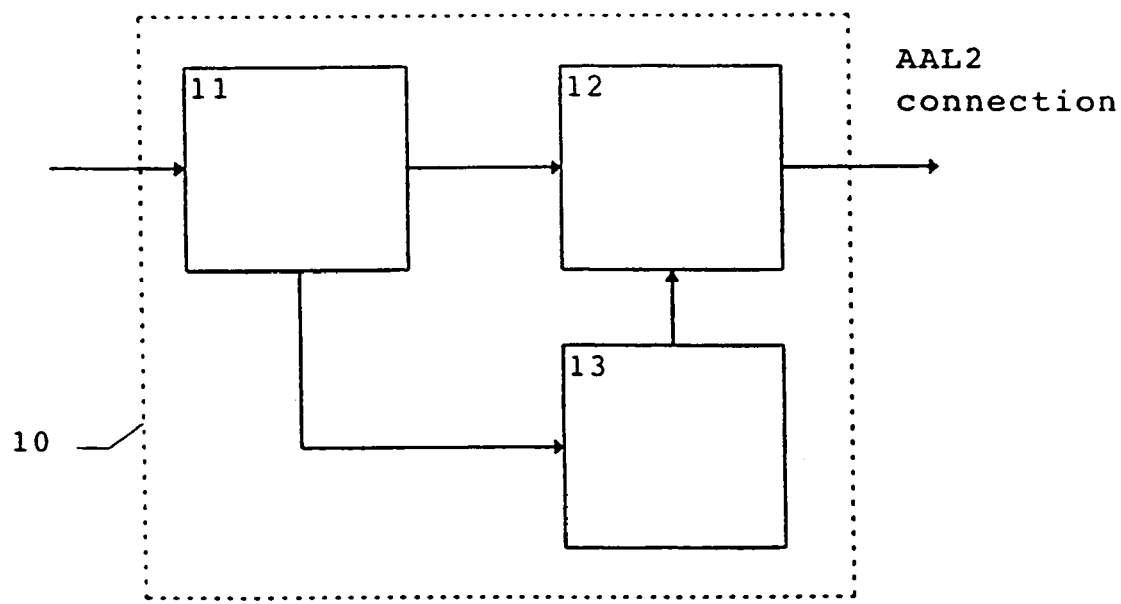
FIG. 3 shows a principle block diagram of a network element comprising a frame control apparatus according to the preferred embodiment of the invention.

FIG. 3 shows a principle diagram of a downlink or uplink part of a network element 10 such as the RNC 3 or a base station controller BSC of the BSS 2, respectively. The network element 10 is arranged at one end of a transmission link such as the AAL2 connection. An input signal comprising TBs to be transmitted via the AAL2 connection is received by a receiving means 11 which extracts the TBs from the received input signal and supplies the extracted TBs to a frame generating means 12. The frame generating means 12 encapsulates the supplied TBs in frames in accordance with the RBTP, so as to generate the RBTP frames to transmitted via the AAL2 connection.

Furthermore, a selecting means 13 is provided which receives from the receiving means 11 an information concerning the connection type of the dedicated transport channel. This connection type information may be derived from received parameters of the dedicated transport channel. Based on the connection type information, the selecting means 13 selects a specific frame type coding and controls the frame generating means 12 so as to generate the RBTP frames in accordance with the selected frame type coding.

The frame type coding can be selected in the set-up phase based on the parameters of the dedicated transport channel, and may be modified by the selecting means 13 when the parameters are changed. Moreover, in case different transport formats are used in the dedicated channel, the transport format currently used for a specific user plane data unit set may also specify if and how the whole user plane data unit set is split into different TBs of the RBTP. Optionally, the value of a transport format indicator (TFI) of the control information portion CI may also be used to determine the presence and bit number of other information fields in the control information portion and their bit numbers.

Thus, the frame type coding of the transport frame and particularly the length of the control information portion CI depends on the connection characteristic of the dedicated channel, in which they are used.

For example, the length in bit of a transport format indicator (TFI) field is given by the number of the different TFIs that are allowed for that channel. Moreover, as already said, the current TFI may define how a complete set of data units or transport blocks (i.e. the transport block set which is processed as a single entity by the OSI layer 1 of the BSS 2) is segmented (if necessary) into different transport frames. The segmentation of the TB may be required if its dimension exceeds the maximum dimension allowed by the underlying transport mechanism of the connecting type of the dedicated channel.

An additional frame reliability information field may be provided in the control information portion, if the TFI value indicates a high bit rate transmission via an established connection. Thereby, quality control of the high bit rate transmission can be improved. However, in case the TFI value indicates a low bit rate transmission via the same connection, such a frame reliability information field is not provided in the control information portion.

In case one transport connection, such as the AAL2 connection, is allocated to a dedicated channel, it is not necessary to provide a channel/sub-channel indicator in the transport frames, because the transmission resources dedicated for the specific channel are used.

In the following, examples for different dedicated channels and their corresponding frame type codings selected by the selecting means 13 are described:

A first dedicated channel DCH1 may be a speech channel with two transport formats relating to 4.8 kbit/s and 0 kbit/s (Discontinuous Transmission, DTX). In this case, each transport frame carries two transport blocks TB, transmitted in 20 ms, or no data (speechless period), and may be composed such that the TBs are provided with their Cyclic Redundancy Check (CRC) information or another reliability information. The control information portion CI comprises a frame number (N bits, constant as a system parameter), a TFI field of only one bit defining the two transport formats, i.e. speech or no speech, and all relevant outer loop PC information.

Furthermore, a second dedicated channel DCH2 may be provided, to which a CS variable rate connection with 16 different transport formats corresponding up to 256 kbit/s is allocated. Here, the structure of the transport frame corresponds to that of the DCH1, wherein the TFI field is composed of 4 bits the value of which determines how the whole transport block set is segmented. For example, TFI=16 indicates three transport frames for every transport block set, wherein the structure of the second and third frame is different from the structure of the first frame. In this case, it is not necessary to specify any frame number in the second and third frame.

Additionally, a third dedicated channel BCH3 may be provided for a unidirectional best effort packet data connection without macro diversity. In this case, the transport frame not necessarily requires all the fields related to the outer loop PC and a macrodiversity combiner in the control information portion CI. However, if a common pipe is used to transport multiple dedicated channels of this type, the control information portion CI of the transport frame must include a channel identifier.

As can be gathered from the above description of the preferred embodiment, the frame type coding of the transport frame, i.e. fields and bit number per field of the control information portion CI, its dimension and segmentation, is defined for each connection type of the dedicated channel and may change when the channel parameters defining the connection type are changed. Thus, this connection type specific frame type coding requires less bits then the above mentioned traditional coding method, and transmission and processing capacity can be saved.

It should be understood that the above description and accompanying drawings are only intending to illustrate the present invention. Thus, the frame control method and apparatus according to the present invention may also be used in other communications systems having different types of connections. The preferred embodiment of the invention may vary within the scope of the attached claims.

A frame control method and apparatus is described for controlling a transport frame used for transmitting a data unit via a dedicated channel between network elements of a communication system having different types of connections. The frame type coding of the transport frame is selected in accordance with a connection type of the dedicated channel, such that a connection-type specific frame length, dimension and/or segmentation is achieved. This allows an efficient usage of transmission resources, wherein an overhead of control information for the transmission of the data units is minimized.

What is claimed is:

1. A frame control method for controlling a transport frame used for transmitting a data unit (TB) via a dedicated channel between network elements (2, 3; 10) of a communication system having different types of connections, comprising the steps of:

(a) encapsulating said data unit (TB) into said transport frame;

(b) selecting a frame type coding of said transport frame in accordance with a connection type of said dedicated channel; and (c) maintaining information on the frame types to be used for data units on a dedicated channel, wherein said frame type coding defines specific control information fields of the transport frame and its bit number, wherein said specific control information fields include a transport format indicator field, the bit number of the transport format indicator field is determined on the basis of the number of different transport format indicators allowed for said dedicated channel, and wherein a value of said transport format indicator field defines if and how a whole original data unit set is split into different data units to be transported via said dedicated channel.

2. A frame control method according to claim 1, wherein said frame type coding is selected in a set-up phase of said dedicated channel based on corresponding setup parameters of said dedicated channel.

3. A frame control method according to claim 1, wherein said frame type coding does not include a channel indicator field, if one transport connection is allocated to said dedicated channel.

4. A frame control method according to claim 1, wherein said frame control method is used in a user plane interface of a WCDMA system.

5. A frame control method according to claim 4, wherein said dedicated channel is an AAL2 channel and said data unit is a user plane data unit.

6. A frame control method for controlling a transport frame used for transmitting a data unit (TB) via a dedicated channel between network elements (2, 3; 10) of a communication system having different types of connections, comprising the steps of:
   (a) encapsulating said data unit (TB) into said transport frame;
   (b) selecting a frame type coding of said transport frame in accordance with a connection type of said dedicated channel; and
   (c) maintaining information on the frame types to be used for data units on a dedicated channel,
   wherein said frame type coding defines specific control information fields of the transport frame and its bit number,
   wherein said specific control information fields include a transport format indicator field, the bit number of the transport format indicator field is determined on the basis of the number of different transport format indicators allowed for said dedicated channel and
   wherein a value of said transport format indicator field defines the presence and/or bit number of another one of said specific control information fields.

7. A frame control method according to claim 6, wherein said another one of said specific control information fields is a frame reliability information field which is provided when the value of said transport format indicator field indicates a high bit rate transmission.

8. A frame control apparatus for controlling a transport frame used for transmitting a data unit (TB) via a dedicated channel between network elements (2, 3; 10) of a communication system having different types of connections, comprising:
   (a) means (12) for encapsulating said data unit (TB) into said transport frame;
   (b) means (13) for selecting a frame type coding of said transport frame in accordance with a connection type of said dedicated channel; and
   (c) means for maintaining information on the frame types to be used for data units on a dedicated channel
   wherein said frame type coding defines specific control information fields of the transport frame and its bit number,
   wherein said specific control information fields include a transport format indicator field, the bit number of the transport format indicator field is determined on the basis of the number of different transport format indicators allowed for said dedicated channel, and
   wherein a value of said transport format indicator field defines if and how a whole original data unit set is split into different data units to be transported via said dedicated channel.

9. A frame control apparatus according to claim 8, wherein said network element (2, 3; 10) comprise a base station subsystem (2) and a radio network controller (3) of a mobile communication system (6).

* * * * *